March 6, 1928.
A. R. CHISHOLM
SPOON TRAY
Filed April 5 1927
1,661,787
2 Sheets-Sheet 1
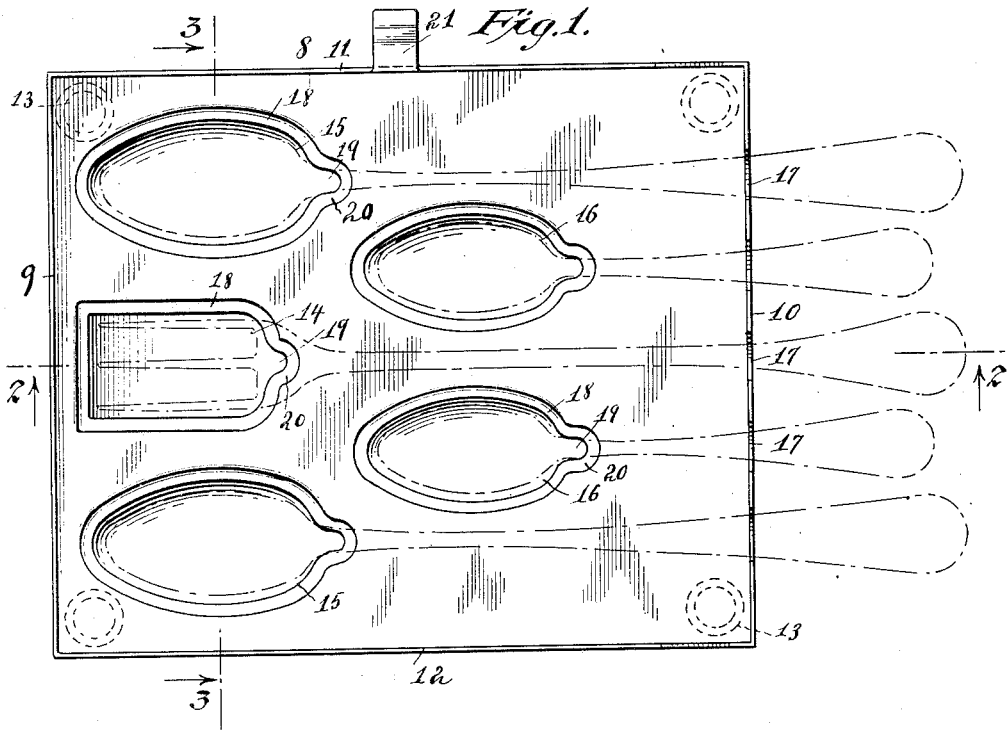
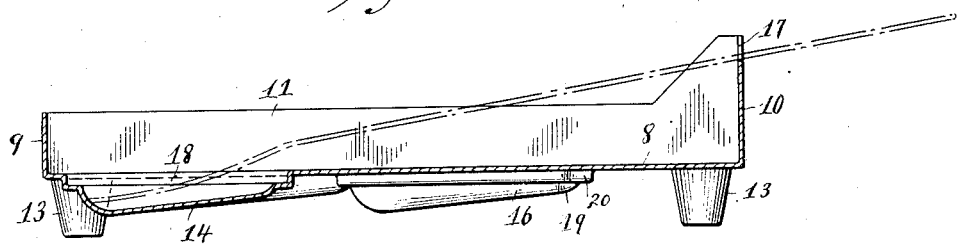
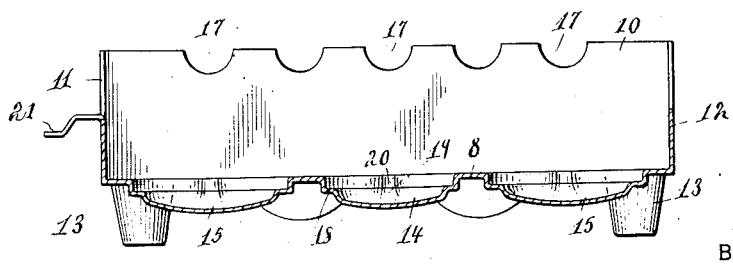
INVENTOR
Aaron R. Chisholm
BY Charles R. Searle
ATTORNEY March 6, 1928.   1,661,787

A. R. CHISHOLM

SPOON TRAY

Filed April 5 1927    2 Sheets-Sheet 2

INVENTOR
Arron R. Chisholm
BY
Charles K. Searle
ATTORNEY

Patented Mar. 6, 1928.

1,661,787

UNITED STATES PATENT OFFICE.

ARRON R. CHISHOLM, OF EAST ORANGE, NEW JERSEY.

SPOON TRAY.

Application filed April 5, 1927. Serial No. 181,021.

The invention relates to receptacles for spoons, ladles, forks and like utensils used in culinary processes, and the object of the invention is to provide a conveniently arranged tray or pan for the reception of such articles during the intervals between active use in cooking operations and thus avoid soiling the table, stove-top or other surface by the drip therefrom, and also to present such articles in position for service when next required.

The invention consists in certain novel features and details of construction and arrangement by which the above objects are attained, to be hereinafter described and claimed.

The accompanying drawings form a part of this specification and show approved forms of the invention.

Figure 1 is a plan view showing the invention in its most complete development.

Figure 2 is a longitudinal vertical section of the same taken on the line 2—2 in Figure 1.

Figure 3 is a corresponding transverse section, taken on the line 3—3 in Figure 1.

Figure 4:
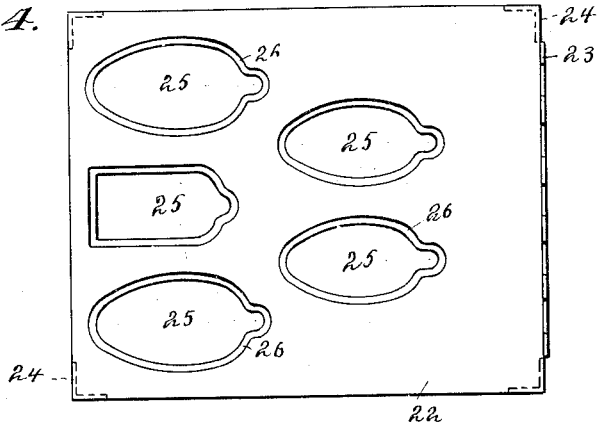
Figure 4 is a plan view showing a modification of the invention.

Referring to Figures 1, 2 and 3, in which similar reference numerals indicate the same parts, 8 is a plate preferably of sheet metal having its margins upturned to form a front 9, back 10 and sides 11 and 12, the whole constituting a shallow pan, supported on legs 13 at the corners.

The plate 8 has depressions or shallow wells produced on its upper face corresponding in shape to the contours of the various utensils to be accommodated, as at 14 for a meat fork, 15 for large kitchen spoons or ladles and 16 for smaller spoons, and the rear wall 10 of the pan is of greater height and is provided with notches 17 to serve as a ledge for supporting the handles of such utensils and presenting them conveniently.

Each well is surrounded by a shallower counter-sunk depression or rebate 18 and each well has a rearward extension 19 and a similar shaped rebate-portion 20.

In using the tray it may be placed upon the kitchen table or upon the stove-top, with the several utensils in place thereon, and as each is used, as in stirring material in process of cooking, it is replaced with its bowl or tines in its individual well, thus preventing the drip from soiling the table or stove and allowing it to collect in the well, to which it is directed by the rebates 18 and 20. The high rear wall or ledge 10 with its notches 17 supports the handles of the utensils at such an angle as to cause the drip from the shanks thereof to flow directly to the wells, and thus avoids soiling the handles and at the same time presenting them conveniently when the utensil is again needed.

When the cooking operations are completed the pan with its wells and the used utensils may be easily cleaned ready for further service.

At one side 11 of the pan is shown a projecting arm 21 shaped to engage any conveniently located orifice in the stove-top, not shown, and thus supports the pan with the side 11 in contact with such top and approximately flush, therewith, leaving the stove-top unincumbered, if desired.

Figure 5:
Figure 5 is a side elevation corresponding to the preceding figure.

In the modification shown in Figures 4 and 5, the front and side walls are omitted leaving only the notched rear wall or ledge 23 on the plate 22 formed by bending up the margin of the plate. The legs 24 are similarly formed at the corners of the plate. The wells 25 and rebates 26 are arranged as in Figure 1.

Figure 6:
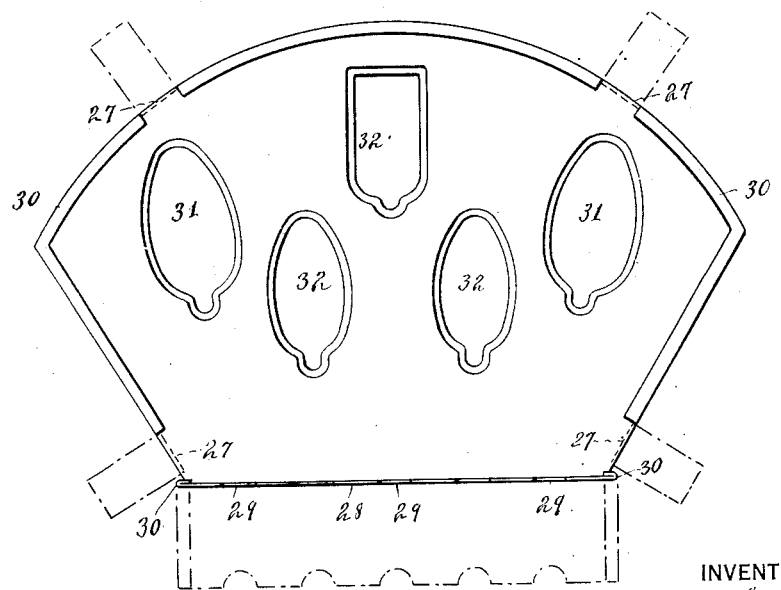
Figure 6 is a plan view showing a further modification.

The form shown in Figure 6 is fan shaped and comprises a single sheet of metal struck by dies to produce the legs 27 and the legs 28 with its notches 29. The margins are folded to form smoothly rounded edges 30 and the wells 31 are arranged angularly to the intermediate wells 32, thus effecting a saving of space.

Although the invention is described as made of sheet metal, any suitable material may be employed and the number of wells and their arrangement relatively to each other may be varied.

The location of the arm 21 may be changed and two or more such arms may be employed if found necessary or desirable.

I claim:—

1. The tray described for supporting spoons, ladles, forks and similar utensils, comprising a plate having a plurality of depressions in its upper face each adapted to receive the effective end portion of one of such utensils and receive the drip therefrom, and a ledge on said plate having a plurality of notches adapted to receive and support the handles of such utensils in position to lead the drip from the shanks of said handles to said depressions.

2. The tray described for supporting spoons, ladles, forks and similar utensils, comprising a plate having a plurality of depressions in its upper face each adapted to receive the effective end portion of one of such utensils and receive the drip therefrom, inclosing walls on the margins of said plate, one of said walls having separated notches each adapted to receive and handle of one of such utensils and serving as a ledge to support such handles in an inclined elevated position relatively to said effective portions and lead the drip from the shanks of said handles to said depressions.

3. The tray described for supporting spoons, ladles, forks and similar utensils comprising a plate having a plurality of depressions in its upper face adapted to receive the effective portions of such utensils and similar in outline thereto, each of said depressions surrounded by a rebate of less depth than said depressions and means on said plate for supporting the handles of such utensils in an inclined elevated position relatively to said effective portions.

In testimony that I claim the invention above set forth, I affix my signature hereto.

ARRON R. CHISHOLM.